United States Patent
Nagaoka (10) Patent No.: US 6,667,590 B2
(45) Date of Patent: Dec. 23, 2003

(54) POWER WINDOW APPARATUS WITH FUNCTION OF FOREIGN OBJECT DETECTION

(75) Inventor: Shuichi Nagaoka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 108 days.

(21) Appl. No.: 10/081,384

(22) Filed: Feb. 21, 2002

(65) Prior Publication Data

US 2002/0149334 A1 Oct. 17, 2002

(30) Foreign Application Priority Data

Feb. 26, 2001 (JP) ........................................ 2001-050532

(51) Int. Cl.⁷ .............................................. E05F 15/16
(52) U.S. Cl. ....................... 318/286; 318/433; 318/434; 318/463
(58) Field of Search ................................ 318/255, 256, 318/257, 264, 265, 266, 286, 293, 463, 466, 467, 468, 469, 430, 431, 432, 433, 434; 388/903, 907.2, 907.5, 909, 921

(56) References Cited

U.S. PATENT DOCUMENTS

| 5,422,551 A | * | 6/1995 | Takeda et al. | ............... 318/265 |
| 5,521,473 A | | 5/1996 | Mizuno et al. | |
| 5,723,960 A | * | 3/1998 | Harada | ........................ 318/469 |
| 5,945,796 A | * | 8/1999 | Ohmori et al. | ............. 318/266 |
| 5,977,732 A | * | 11/1999 | Matsumoto | .................. 318/283 |
| 5,994,858 A | * | 11/1999 | Miura | ......................... 318/283 |
| 6,054,822 A | | 4/2000 | Harada | |
| 6,426,604 B1 | * | 7/2002 | Ito et al. | ....................... 318/466 |

FOREIGN PATENT DOCUMENTS

JP          61-60981          3/1986

\* cited by examiner

*Primary Examiner*—Bentsu Ro
(74) *Attorney, Agent, or Firm*—Brinks Hofer Gilson & Lione (57) ABSTRACT

The apparatus comprises a motor, a motor driver, a pulse generator, an MCU incorporating a memory, and an open/close switch. The MCU compares the motor load torque detected at the time of opening or closing the window, with a reference value stored in the memory; when the torque considerably exceeds the reference value, it concludes that there is a foreign object caught in the window and stops or reverses the motor and inactivates the function of foreign object detection until there is no transitional torque fluctuation in the transitional period from a start of the motor. The MCU compares the torque variation per unit time with a permissible variation range stored in the memory; when the number of successive torques which fall within the permissible variation range reaches a maximum permissible number of such successive torques stored in the memory, it activates the function of foreign object detection.

2 Claims, 4 Drawing Sheets

POWER WINDOW APPARATUS WITH FUNCTION OF FOREIGN OBJECT DETECTION

BACKGROUND OF THE INVENTION

1. Field of the Invention

The present invention relates to a power window apparatus with a function to detect a foreign object caught in the window, and particularly to a power window apparatus which shortens the non-detection time in the motor startup period and can detect an object caught in the window even during the motor startup period.

2. Description of Related Art

A conventional car power window apparatus with a function to detect a foreign object is known where, if it detects a foreign object caught in a window during a manual or automatic closing operation of the window, it stops the movement of the window immediately or moves the window in the window opening direction.

The conventional power window apparatus uses motor load current values as parameters for detection of a foreign object caught in the window (this type of apparatus is hereinafter called a "load current based type"). In this apparatus, the whole window moving range is divided into multiple moving subdivisions and a reference current value indicating whether a foreign subject is caught in the window or not is preset for each moving subdivision; as the window moves through each of these subdivisions, the motor load current value detected in the subdivision is compared with the reference current value preset for that subdivision and if, as a result of comparison, the motor load current value is found to considerably exceed the reference current value, the apparatus concludes that a foreign object has been caught in the window and immediately stops the movement of the window or moves the window in the window opening direction.

In this power window apparatus, reference current values to be preset for the multiple moving subdivisions are determined as follows: as the window moves through the subdivisions, the peak motor load current for each of such subdivisions is measured in the condition that nothing is caught in the window. The reference current value for a subdivision is thus determined according to the measured peak current value for that subdivision.

Among known power window apparatuses capable of detecting a foreign object, there is a type which uses motor load torques as parameters for foreign object detection instead of motor load current values (this is hereinafter called a load torque based type.).

In the load current based type of power window apparatus or the load torque based type of power window apparatus, when the motor for opening/closing the window is started, initially the load current which flows through the motor transitionally fluctuates or the load torque which is generated from the motor transitionally fluctuates and therefore the load current value or load torque value measured during the period of transitional fluctuation is not a stable, correct value and cannot be used to detect a foreign object caught in the window correctly. Therefore, in the load current based type of power window apparatus or the load torque based type of power window apparatus, an operation to detect a foreign object caught in the window is not performed during the period of instability (motor startup period) from the start of the motor until the motor load current value or motor load torque value is stabilized or becomes almost constant, but such an operation is performed just after completion of this period of instability.

In the load torque based type power window apparatus in particular, the motor load torque may fluctuate to a relatively large degree during the period of instability, or this period of instability, which lasts until the motor load torque becomes almost constant, may be prolonged.

In other words, for the load torque based type of power window apparatus, the amount of motor load torque variation in the motor startup period varies depending on the following factors: the starting torque characteristic of the motor in use; the structure of the window moving mechanism including the window to be driven by the motor; the type of car; the number of years when the car has been used; the external conditions or environment in which the car is used, and other factors. In addition, the length of the period of instability until the motor load torque becomes almost constant varies as well.

Figure 4:
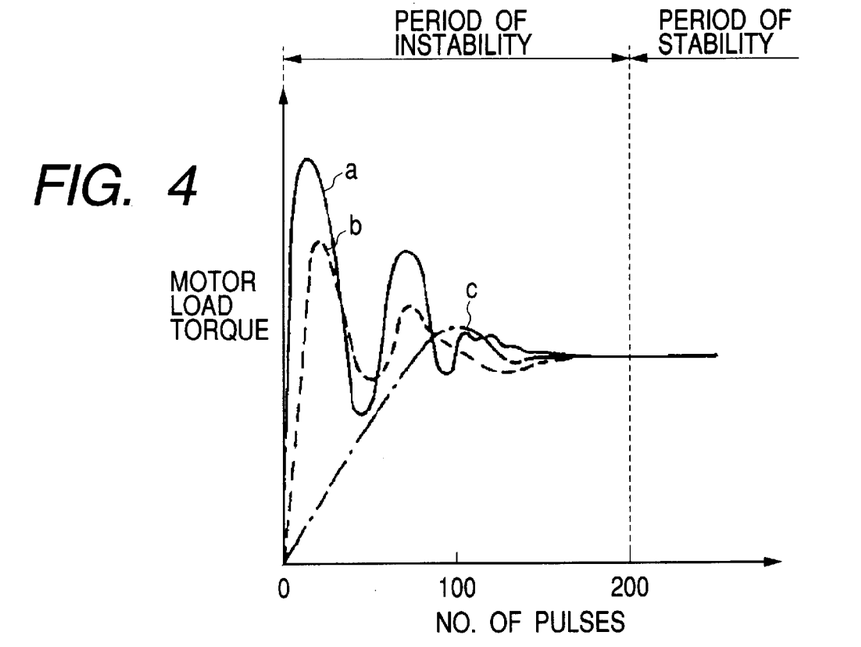
FIG. 4 is a characteristic graph showing an example of the relation between the number of pulses and the motor load torque in the startup period for multiple motors.
Figure 5:
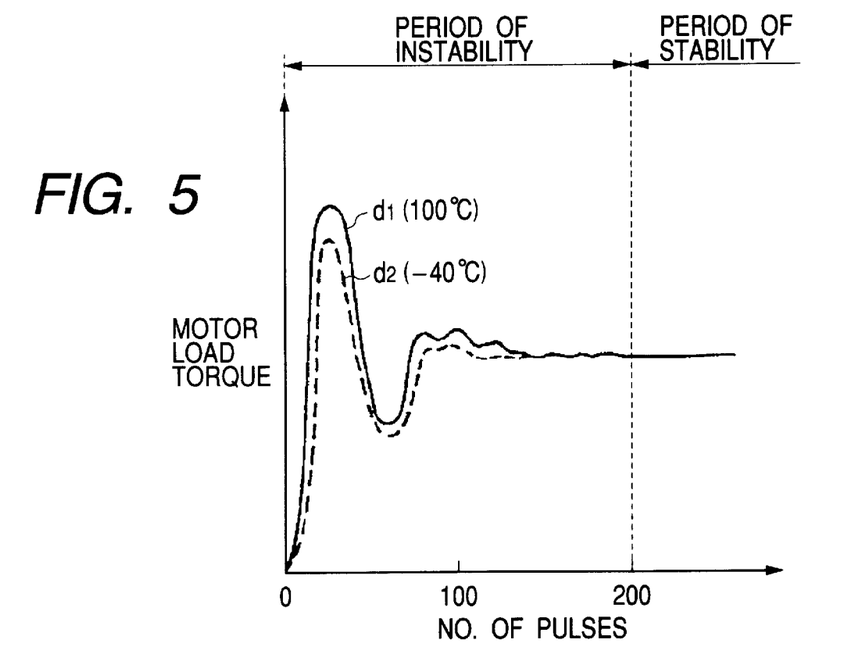
FIG. 5 is a characteristic graph showing an example of the relation between number of pulses and the motor load torque at different ambient temperatures.

FIG. 4 is a characteristic graph showing an example of the relation between the number of pulses and the motor load torque in the motor startup period in three motors and window moving mechanisms which are arbitrarily chosen; and FIG. 5 is a characteristic graph showing an example of the relation between the number of pulses and the motor load torque in the motor startup period at different ambient temperatures for a motor and its window moving mechanism.

For three arbitrarily chosen motors A, B and C, the characteristic curves of motors A, B and C are represented by a, b and c, respectively, as shown in FIG. 4. From this figure, the characteristics of motors A, B and C in the startup period may be compared and described as follows. The characteristic curve a for the motor A shows that the variation in motor load torque is the largest and the period of instability (a period required until the motor load torque becomes almost constant) is the longest, and the end of the period of instability is just before pulse number 200; the characteristic curve b for the motor B shows that the variation in motor load torque is smaller than in the characteristic curve a and the period of instability is shorter than in the characteristic curve a, and the end of the period of instability is slightly beyond pulse number 150; and the characteristic curve c for the motor C shows that the variation in motor load torque is the smallest and the period of instability is the shortest, and the end of the period of instability is before pulse number 150.

Namely, the motor load torque variation in the motor startup period and the length of the period of instability (a period which lasts until the motor load torque becomes almost constant) differ among these motors and window moving mechanisms for opening/closing the windows. It may also be said that the motor load torque variation and the period of instability differ among any other chosen motors and window moving mechanisms.

The characteristic curve of a chosen motor D at an ambient temperature of 100° C. and that at an ambient temperature of −40° C. are represented by d1 and d2, respectively, as shown in FIG. 5. The characteristic curve d1 concerning the startup period for motor D shows that the variation in motor load torque is larger and the period of instability (a period required until the motor load torque becomes almost constant) is longer, and the end of the period of instability is slightly beyond pulse number 150; on the other hand, the characteristic curve d2 shows that the variation in motor load torque is smaller than in the characteristic curve d1 and the period of instability is slightly shorter than in the characteristic curve d1, and the end of the period of instability is before pulse number 150.

This means that even in the same motor and window moving mechanism used for opening/closing the window, the motor load torque variation in the motor startup period and the length of the period of instability (a period which lasts until the motor load torque becomes almost constant) differ depending on the external conditions or environment in which they are used.

For the above reason, in the load torque based type of power window apparatus, the time to start detection for a foreign object caught in the window is preset to a time when most motors have ended their period of instability and have entered the period of stability (for example, a time when pulse number 200 is reached as shown in FIG. 4), because the load torque characteristic in the motor startup period differs among motors and window moving mechanisms for opening/closing the window, as discussed above.

For the abovementioned load torque based type of power window apparatus, in which the time to start detection for a foreign object in the window is preset to a time when most motors have ended their period of instability and entered the period of stability, the non-detection period, or a period from the start of the motor to the start of detection for a foreign object is relatively long; if a foreign object is caught in the window during this non-detection period, it cannot be detected and thus no countermeasure cannot be taken.

SUMMARY OF THE INVENTION

In view of the abovementioned technical background, it is an object of the present invention to provide a power window apparatus which shortens the non-detection period from the start of the motor to the start of detection for a foreign object as much as possible and thus decreases the probability of a foreign object being caught in the non-detection period.

In order to achieve the abovementioned object, according to one aspect of the present invention, the power window apparatus with a function of foreign object detection comprises: a motor for opening or closing the window; a motor driver for driving the motor; a pulse generator for generating pulses corresponding to a run of the motor; a memory for storing various values to be preset; a micro control unit for overall drive control; and a window operation switch for opening and closing the window. Here, the micro control unit detects a value of motor load torque applied to the window at the time of opening or closing it and compares the value of motor load torque with a reference value stored in the memory. If the value of motor load torque is larger than the reference value by a prescribed amount, the micro control unit concludes that there is a foreign object caught in the window and stops or reverses the motor through the motor driver and inactivates the function of foreign object detection until a transitional period of motor load torque fluctuation from the start of the motor is over. The power window apparatus further comprises a timer. Here, a permissible variation range in the value of motor load torque and a maximum successive number, which are used to determine the end of the transitional period of motor load torque fluctuation, are stored in the memory.

The micro control unit comprises a control processor by which a variation in the value of motor load torque per unit time is monitored from the start of the motor using the timer, and by which, when it is found that a number of successive torques which the variation in the value of motor load torque fall within the permissible variation range has reached the preset maximum successive number, it is concluded that the time to end the transitional period of motor load torque fluctuation has been reached and the function of a foreign object detection is activated.

It is desirable that the permissible variation range and maximum successive number which are stored in the memory of the above apparatus are determined for each motor in use according to an actually measured starting characteristic of the motor.

According to another aspect of the present invention, for each motor in use, the permissible range of motor torque variation per unit time and the maximum number of successive torques which fall within the permissible variation range are previously stored in the memory; when the motor is started, the motor torque variation per unit time is compared with the permissible range of motor torque variation per unit time stored in the memory; when the variation comes to fall within the permissible range, how many times a torque within the permissible variation range is produced successively is detected, and when the number of such detected torque values exceeds the maximum successive number stored in the memory, it is concluded that the transitional period of motor load torque fluctuation has ended, and the function to detect a foreign object caught in the window is immediately activated. Therefore, the non-detection period (namely, a period from the start of the motor until the start of foreign object detection) is shorter than in the conventional apparatus, thereby reducing the probability of a foreign object being caught in the window during the non-detection period.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described in detail referring to the accompanying drawings.

Figure 1:
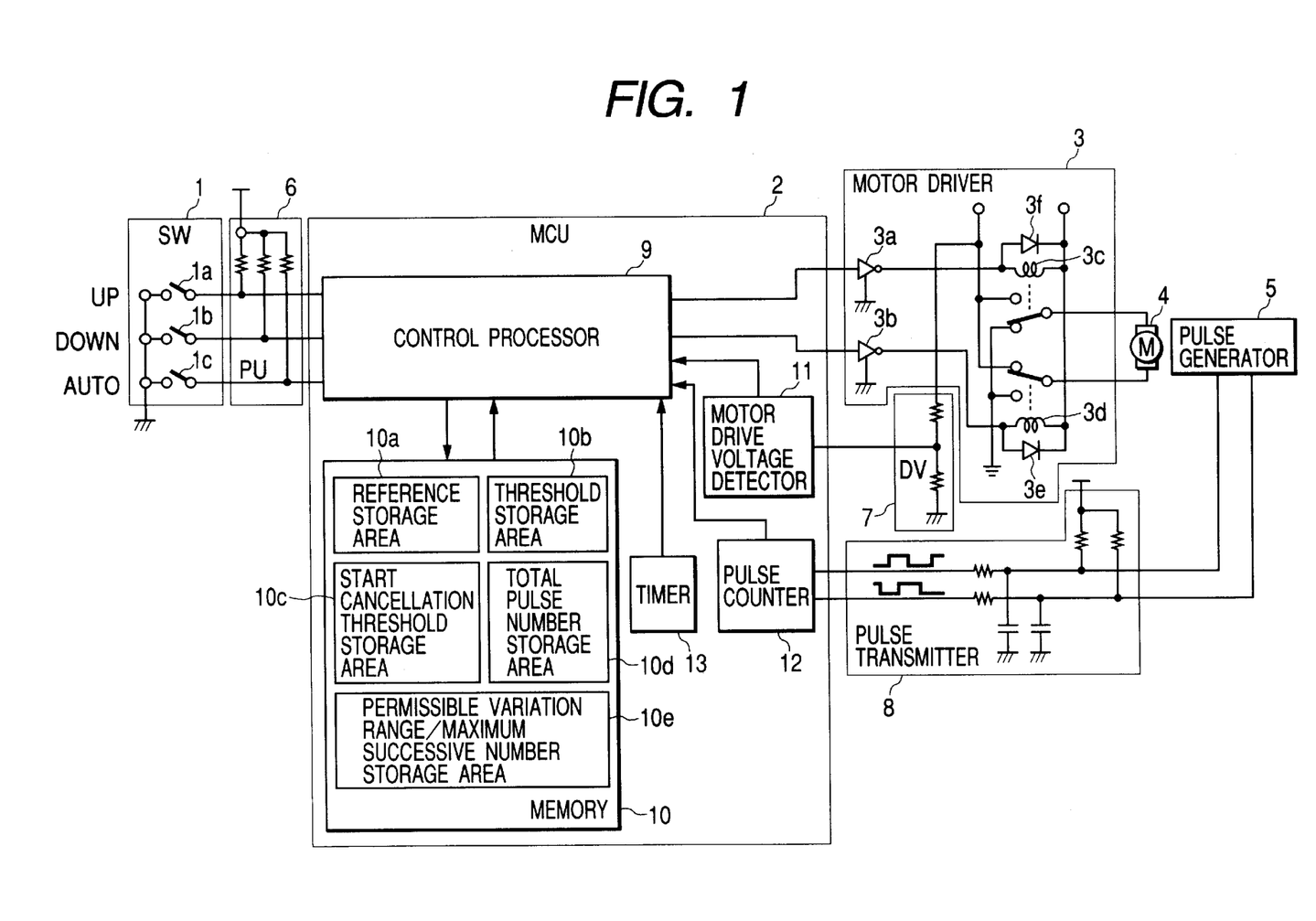
FIG. 1 is a block diagram showing the structure of the main part of a power window apparatus with a function to detect a foreign object caught in the window according to an embodiment of the present invention.

FIG. 1 is a block diagram showing the structure of the main part of a power window apparatus with a function of foreign object detection according to an embodiment of the present invention.

As shown in FIG. 1, this power window apparatus having a function of foreign object detection comprises a window open/close switch (SW) 1, a micro control unit (MCU) 2, a motor driver 3, a motor (M) 4, a pulse generator 5, a pull-up circuit (PU) 6, a supply voltage dividing circuit (DV) 7, and a pulse transmitter 8.

The window open/close switch 1 has a close (UP) switch 1a, an open (DOWN) switch 1b and an AUTO switch 1c, which are individually and manually operated. The close switch 1a gives an instruction to raise (close) the window and the open switch 1b gives an instruction to lower (open) the window. As the close switch 1a or open switch 1b is operated, the window is moved in the specified direction; as operation of the close switch 1a or open switch 1b is stopped, the window stops moving as well. The AUTO switch 1c gives an instruction to continue the window movement automatically. When the user operates the close switch 1a and the AUTO switch 1c simultaneously, the window begins ascending (closing), and then even after the user stops operating the AUTO switch 1c and the close switch 1a, the window's ascending (closing) motion continues until it reaches the upper limit position. Likewise, when the user operates the open switch 1b and the AUTO switch 1c simultaneously, the window begins descending (opening), and then even after the user stops operating the AUTO switch 1c and the open switch 1b, the window's descending (opening) motion continues until it reaches the lower limit position.

The micro control unit 2 comprises a control processor 9, a memory 10, a motor drive voltage detector 11, a pulse counter 12, and a timer 13. Here, the control processor 9 generates a control signal which depends on how the close switch 1a, open switch 1b or AUTO switch 1c is operated. This control signal is supplied through the motor driver 3 to the motor 4 to run the motor 4. At the same time, the control processor 9 carries out data processing and arithmetic operation as prescribed using such data as detection data from the motor drive voltage detector 11, pulse count data from the pulse counter 12 and various types of stored data read from the memory 10. According to the result of such data processing, the run of the motor 4 is controlled through the motor driver 3. The memory 10 comprises five storage areas: a reference storage area 10a, a threshold storage area 10b, a start cancellation threshold storage area 10c, a total pulse number storage area 10d and a permissible variation range/maximum successive number storage area 10e. What type of data is stored in the storage areas 10a to 10e will be stated later. The motor drive voltage detector 11 detects divided voltage in the supply voltage dividing circuit 7 and supplies the detected divided voltage to the control processor 9. The pulse counter 12 counts two-phase square wave pulses from the pulse generator 5 and sends the result of such counting to the control processor 9.

The motor driver 3 incorporates control signal inverters 3a and 3b, relays 3c and 3d for selecting the running mode of the motor 4 (normal rotation, reverse rotation, stop) and diodes 3e and 3f for prevention of sparking. It runs the motor 4 according to the control signal sent from the control processor 9.

The motor 4 is connected to the window through the window drive mechanism whose axis of rotation is not shown in the figure. When the motor 4 runs in the normal direction, the window closes; on the other hand, when it reverses, the window opens.

The pulse generator 5 is directly attached to the motor 4. It generates two-phase pulses which differ in phase by 90 degrees. Two-phase pulses are generated by a magnetized rotor which rotates together with the motor 4, as well as plural Hall elements located adjacently to the rotor.

The pull-up circuit 6 consists of pull-up resistors (not numbered in the figure) which are connected between a power supply and outputs of the switches 1a to 1c; it feeds supply voltage (for example, 8V) to the control processor 9 when the switches 1a to 1c are not operated.

The supply voltage dividing circuit 7 consists of two resistors (not numbered in the figure) which are connected in series between the car-mounted power supply (battery) and the ground; the divided voltage at the point of connection between the two resistors is fed to the motor drive voltage detector 11.

The pulse transmitter 8 consists of pull-up resistors (not numbered in the figure) each of which is connected between an output of the pulse generator 5 and the power supply, capacitors (not numbered in the figure) each of which is connected between the output and the ground, and serial resistors (not numbered in the figure) each of which is connected between the output and an input of the pulse counter 12. It sends two-phase square wave pulses from the pulse generator 5 to the pulse counter 12.

While the motor 4 is running and the window is moving in the opening or closing direction, two-phase square wave pulses generated by the pulse generator 5 are supplied to the pulse counter 12 through the pulse transmitter 8. The pulse counter 12 detects the pulse edges of the two-phase square wave pulses, counts the detected pulse edges, and sends the result of counting to the control processor 9. The pulse generator 5 generates a pulse, for example, every ¼ turn of the motor 4. As the window moves throughout its moving range (the moving area between its fully open position and fully closed position), or from one end to the other end, 1200 pulses are outputted and this output is detected by the pulse counter 12.

This power window apparatus with a function of foreign object detection uses motor load torques as parameters for detection of a foreign object caught in the window. Reference values and threshold values to be stored in the memory 10 are also determined according to motor load torques.

In the power window apparatus with a function of foreign object detection, the window's entire moving range (the moving area between its fully open position and fully closed position) is equally divided into multiple subdivisions according to the number of pulses (pulse number) counted upon each arrival of a pulse; thus it consists of multiple equal subdivisions. For each of these subdivisions, regarding the motor load torque measured when the window passes through that subdivision, the motor torque reference value and the motor torque threshold value (the reference value plus a tolerance) are preset.

In the memory 10, the reference storage area 10a stores a reference value preset for each of the equal subdivisions of the moving area and the threshold storage area 10b stores a maximum permissible or threshold torque value preset for each of the equal subdivisions. The start cancellation threshold storage area 10c stores a threshold pulse number which represents the end of the non-detection period in the motor startup period, where detection for a foreign object does not begin until this threshold pulse number is reached. The total pulse number storage area 10d stores the total of pulses counted by the pulse counter 12. The permissible variation range/maximum successive number storage area 10e stores a permissible range of motor load torque variation in the motor startup period, as well as a maximum successive number which represents a maximum number of successive motor load torques which fall within that permissible variation range. The permissible variation range and maximum successive number are used to check whether the transitional period of motor load torque fluctuation has ended or not.

As described earlier, the permissible variation range and maximum successive number to be stored in the permissible variation range/maximum successive number storage area 10e depend on the following factors: the starting torque characteristic of the motor in use; the structure of the window moving mechanism including the window to be driven by the motor; the type of car; the number of years when the car has been used; the external conditions or environment in which the car is used and other factors. The permissible variation range and maximum successive number are determined by measuring the starting torques actually while moving the window by means of the motor. In other words, these values should be individually determined for each motor.

The power window apparatus with a function of foreign object detection operates in the sequence described next.

When one switch in the window open/close switch 1, for example, the close switch 1a, is operated, the input voltage of the control processor 9, which is connected with the close switch 1a, changes from the supply voltage (for example, 8V) to the earth potential. In response to the input earth potential, the control processor 9 sends the motor driver 3 a control signal to run the motor 4 in the normal direction. The motor driver 3 switches between the relays 3c and 3d in response to this control signal to run the motor 4 in the normal direction. As the motor 4 runs in the normal direction, the window moves in the closing direction by means of the window moving mechanism connected with the motor 4. Running of the motor 4 causes the pulse generator 5 attached to the motor 4 to generate two-phase square wave pulses, which are then sent through the pulse transmitter 8 to the pulse counter 12 where the pulses are counted.

When operation of the close switch 1a is stopped, the input voltage of the control processor 9, which is connected with the close switch 1a, changes from the earth potential to the supply voltage (for example, 8V). In response to the input supply voltage, the control processor 9 sends the motor driver 3 a control signal to stop the motor 4; in response to this control signal, the motor driver 3 switches between the relays 3c and 3d to stop power supply to the motor 4 to stop the motor 4. When the motor 4 stops running, the window moving mechanism attached to the motor 4 stops operation and the window stops at that point. Also, when the motor 4 stops running, the pulse generator 5 attached to the motor 4 stops generating two-phase square wave pulses and supply of two-phase square wave pulses to the pulse counter 12 and counting of pulses by the pulse counter 12 are also discontinued.

When another switch in the window open/close switch 1, for example, the open switch 1b, is operated, as in the abovementioned case, the input voltage of the control processor 9, which is connected with the close switch 1a, changes from the supply voltage to the earth potential. In response to the input earth potential, the control processor 9 sends the motor driver 3 a control signal to run the motor 4 in the reverse direction. In response to this control signal, the motor driver 3 switches between the relays 3c and 3d to run the motor 4 in the reverse direction. As the motor 4 reverses, the window moves in the opening direction by means of the window moving mechanism connected with the motor 4. Again, running of the motor 4 causes the pulse generator 5 attached to the motor 4 to generate two-phase square wave pulses, which are then sent through the pulse transmitter 8 to the pulse counter 12 where the pulses are counted.

Then, as operation of the close switch 1b is stopped, the window stops at that point in accordance with the virtually same operational sequence as when operation of the close switch 1a is stopped, and counting of pulses by the pulse counter 12 is also discontinued.

When the close switch 1a and the AUTO switch 1c are simultaneously operated, or when the open switch 1b and the AUTO switch 1c are simultaneously operated, the operational sequence is the same as when the close switch 1a or open switch 1b is operated alone, except that even after operation of both the switches 1a and 1c or 1b and 1c is stopped, the window does not stop until the fully closed position or fully open position is reached.

Figure 2:
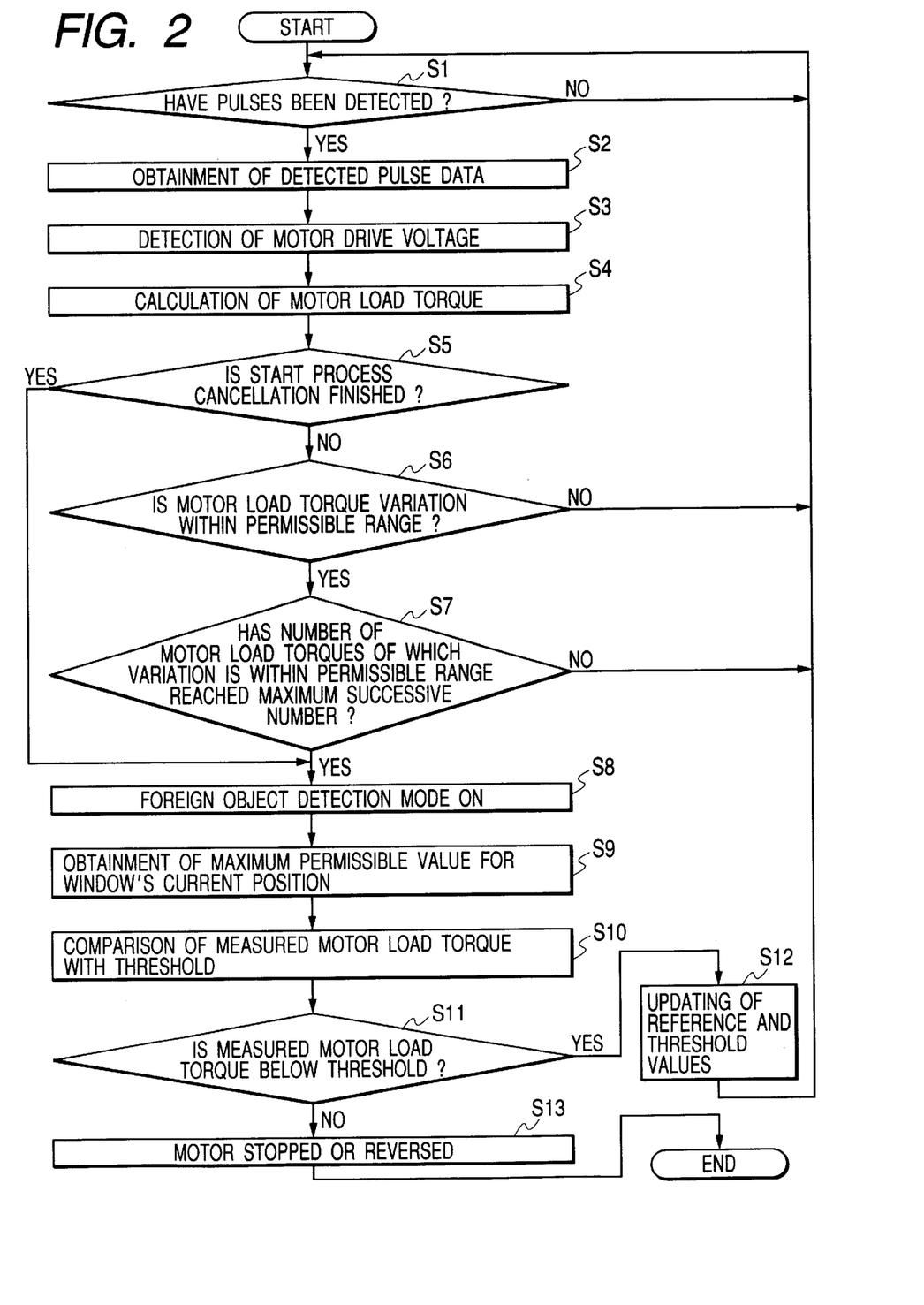
FIG. 2 is a flowchart showing the operational sequence for foreign object detection in the power window apparatus with a function of foreign object detection as shown in FIG. 1.

FIG. 2 is a flowchart showing the operational sequence for detection of a foreign object, in the power window apparatus with a function of foreign object detection as shown in FIG. 1.

Referring to both the block diagram in FIG. 1 and the flowchart in FIG. 2, how a foreign object caught in the window is detected will be explained next.

First, at step S1, the control processor 9 of the micro control unit 2 checks whether the pulse counter 12 has detected pulses sent from the pulse generator 5. If yes, or it is decided that it has detected pulses, the process goes to step S2, while if no, or it is decided that it has not detected pulses yet, this step S1 is repeated.

Then, at step S2, the control processor 9 obtains pulse data: the pulse number Pn and pulse repetition time period Pt which are detected by the pulse counter 12.

Next, at step S3, the control processor 9 detects the divided voltage which is obtained in the supply voltage dividing circuit 7 through the motor drive voltage detector 11, and obtains the detected divided voltage as motor drive voltage E.

At step S4, the control processor 9 uses the obtained pulse repetition time period Pt and motor drive voltage E to calculate motor load torque Tc. In this case, the motor load torque Tc is calculated using the following equation (1):
[Equation 1]

$$Tc = \left\{\left(kt \cdot \frac{E}{Rm}\right) - Tm\right\} - \frac{ke \cdot kt}{Rm \cdot Pt} \qquad (1)$$

where

Tc: Motor load torque

E: Motor drive voltage

Kt: Motor torque coefficient

Rm: Motor winding resistance

Ke: Motor power generation coefficient

Pt: Pulse repetition time period

Tm: Motor internal torque

Then, at step S5, the control processor 9 compares the obtained pulse number Pn with the threshold pulse number stored in the start cancellation threshold storage area 10c to decide whether the start process is cancelled. If yes, or it concludes that the start process is cancelled, the process skips to step S8; if no, or it concludes that start process cancellation is not finished, the process goes to the next step S6.

At step S6, the control processor 9 compares the variation per unit time in the calculated motor load torque Tc (measured value) with the permissible variation range stored in the permissible variation range/maximum successive number storage area 10e to decide whether the variation is within the permissible range. If yes, or it concludes that the variation is within the permissible range, the process goes to the next step S7; if no, or it concludes that the variation is not within the permissible range, the process goes back to the initial step S1 and the steps from step S1 are repeated.

At step S7, the control processor 9 detects how many times a motor load torque which is within the permissible variation range is produced successively, and compares the detected number of such successive torques with the maximum successive number stored in the permissible variation range/maximum successive number storage area 10e to decide whether the number of successive such torques has reached the maximum successive number. If yes, or it concludes that the number of successive such torques has reached the maximum successive number (which is considered to suggest the end of the transitional fluctuation period), the process goes to the next step S8; if no, or it concludes that the number of such successive torques has not reached the maximum successive number, the process goes back to the initial step S1 and the steps from step S1 are repeated.

At step S8, the control processor 9 changes its operating mode into the foreign object detection mode.

At step S9, the control processor 9 reads out and obtains the threshold torque value corresponding to the current position of the window from the threshold storage area 10b.

At step S10, the control processor 9 compares the motor load torque Tc (measured value) calculated at step S4 with the threshold value which has been read out at step 9.

At step S11, by comparing the motor load torque Tc (measured value) calculated at step S4 with the threshold value read out at step S10, the control processor 9 decides whether or not the measured value is below the threshold value. If yes, or it concludes that the measured value is below the threshold value, the process goes to the next step S12; if no, or it concludes that the measured value is equal to or above the threshold value, the process goes to the step S13.

At step S12, if the difference between the motor load torque Tc calculated at step S4 (measured value) and the reference value for the current position of the window is relatively large, the control processor 9 updates the reference value to a value nearer to the measured value. If the reference value is updated, the threshold value which corresponds to that reference value is also updated. In this case, the corresponding reference value stored in the reference storage area 10a as well as the corresponding threshold value stored in the threshold storage area 10b are overwritten by the updated reference value and threshold value, respectively. Once the reference value and threshold value have been updated, the process goes back to the initial step S1 and the steps from step S1 are repeated.

At step S13, the control processor 9 feeds a control signal to the motor driver 3 to switch between the two relays 3c and 3d so that the motor 4 stops running to stop the movement of the window or the motor 4 reverses to move the window in the reverse direction. Now, the operational sequence for control is concluded.

Figure 3:
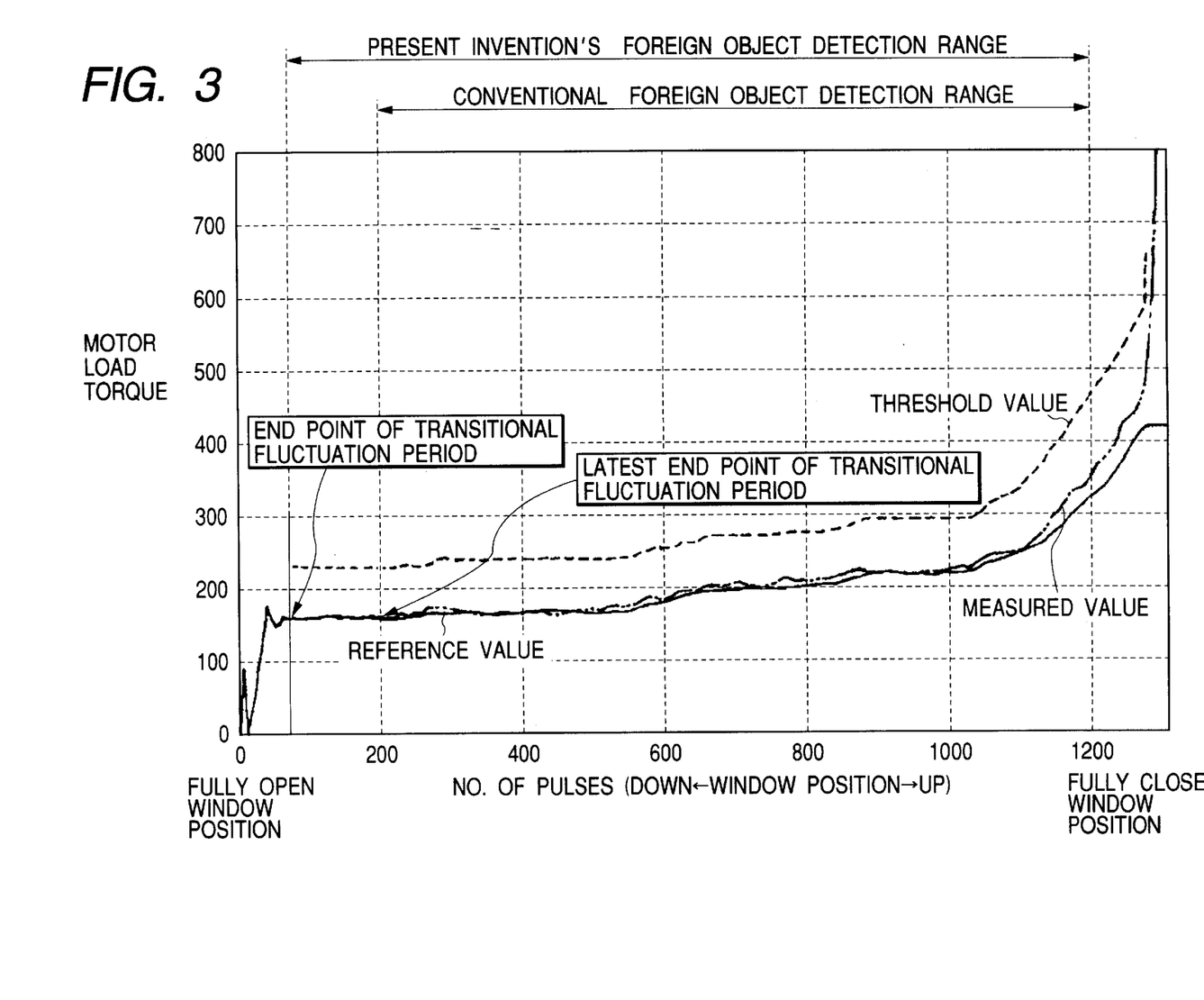
FIG. 3 is a characteristic graph showing an example of the relation between a preset reference and threshold values and measured values in the power window apparatus with a function of foreign object detection according to the embodiment of the present invention as shown in FIG. 1.

FIG. 3 is a characteristic graph showing the relation between preset reference and threshold values and measured values in the power window apparatus with a function of foreign object detection, according to the embodiment of the present invention as shown in FIG. 1.

In FIG. 3, the horizontal axis represents the number of pulses (pulse number) and the vertical axis represents motor load torques; the solid line represents reference values, the upper dotted line represents threshold values and the lower dotted line (alternate long and two short dashes line) represents measured values. This characteristic graph concerns the whole window moving process from when the window opening/closing motor is started with the window fully open until the window reaches its fully closed position. This compares the foreign object detection range between the present invention's power window apparatus and the conventional one.

As shown in FIG. 3, in the power window apparatus with a function of foreign object detection according to this embodiment, the foreign object non-detection range, or the period of instability from the start of the motor until motor load torque stabilization, is limited to a range in which the number of detected pulses is from 0 to 80. When the number of detected pulses exceeds 80 or so ("end point of the transitional fluctuation period" in the figure), the function to detect for a foreign object caught in the window begins working.

On the other hand, in the conventional power window which has a function to detect a foreign object, the foreign object non-detection range, or the period of instability from the start of the motor until motor load torque stabilization, is set to a range in which the number of detected pulses is from 0 to 200. It is only when the number of detected pulses exceeds 200 or so ("latest end point of the transitional fluctuation period" in the figure) that the function to detect for a foreign object caught in the window begins working.

As can be understood from the above explanation, the power window apparatus with a function of foreign object detection according to this embodiment shortens the non-detection period (namely, the period from the start of the motor until the start of foreign object detection) as compared with the conventional similar type apparatus, thereby reducing the probability of a foreign object being caught in the window during the non-detection period.

In the power window apparatus with a function of foreign object detection according to this embodiment, foreign object detection in the window may not begin until start process cancellation is performed, depending on the starting characteristic of the motor in use. Even in that type of motor, foreign object detection begins no later than the latest end point of the transitional fluctuation period shown in FIG. 3.

As discussed so far, according to the present invention, for each motor in use, the permissible range of motor torque variation per unit time and the maximum number of successive torques which falls within the permissible variation range are previously stored in the memory; when the motor is started, the motor torque variation per unit time is compared with the permissible variation range data stored in the memory; when the variation comes to fall within the permissible range, how many times a torque within the permissible variation range is produced successively is detected, and then, when the number of such detected torques exceeds the maximum permissible number of successive torques which is stored in the memory, the function to detect a foreign object caught in the window is immediately activated. Therefore, the non-detection period (namely, the period from the start of the motor until the start of foreign object detection) is shorter than in the conventional power window apparatus, thereby reducing the probability of a foreign object being caught in the window during the non-detection period.

What is claimed is:

1. A power window apparatus with a function of foreign object detection comprising:

a motor for opening or closing a window;

a motor driver for driving the motor;

a pulse generator for generating pulses corresponding to a run of the motor;

a memory for storing various values to be preset;

a micro control unit for overall drive control; and a window operation switch for opening and closing the window, wherein the micro control unit detects a value of motor load torque applied to the window at the time of opening or closing it and compares the value of motor load torque with a reference value stored in the memory, and wherein, if the value of motor load torque is larger than the reference value by a prescribed amount, the micro control unit concludes that there is a foreign object caught in the window and stops or reverses the motor through the motor driver and inactivates the function of foreign object detection until a transitional period of motor load torque fluctuation from a start of the motor is over, the power window apparatus further comprising:

a timer, wherein a permissible variation range in the value of motor load torque and a maximum successive number, which are used to determine an end of the transitional period of motor load torque fluctuation, are stored in the memory, the micro control unit comprising:

a control processor by which a variation in the value of motor load torque per unit time is monitored from the start of the motor using the timer, and by which, when it is found that a number of successive torques which the variation in the value of motor load torque fall within the permissible variation range has reached the preset maximum successive number, it is concluded that the time to end the transitional period of motor load torque fluctuation has been reached and the function of a foreign object detection is activated.

2. The power window apparatus with the function of foreign object detection according to claim 1, wherein the permissible variation range and the maximum successive number which are stored in the memory are determined for each motor according to an actually measured starting characteristic of the motor in use.

* * * * *